S. HANSEN.
INSECT COLLECTING MACHINE.
APPLICATION FILED NOV. 18, 1912.
1,062,648.
Patented May 27, 1913.
3 SHEETS—SHEET 1.
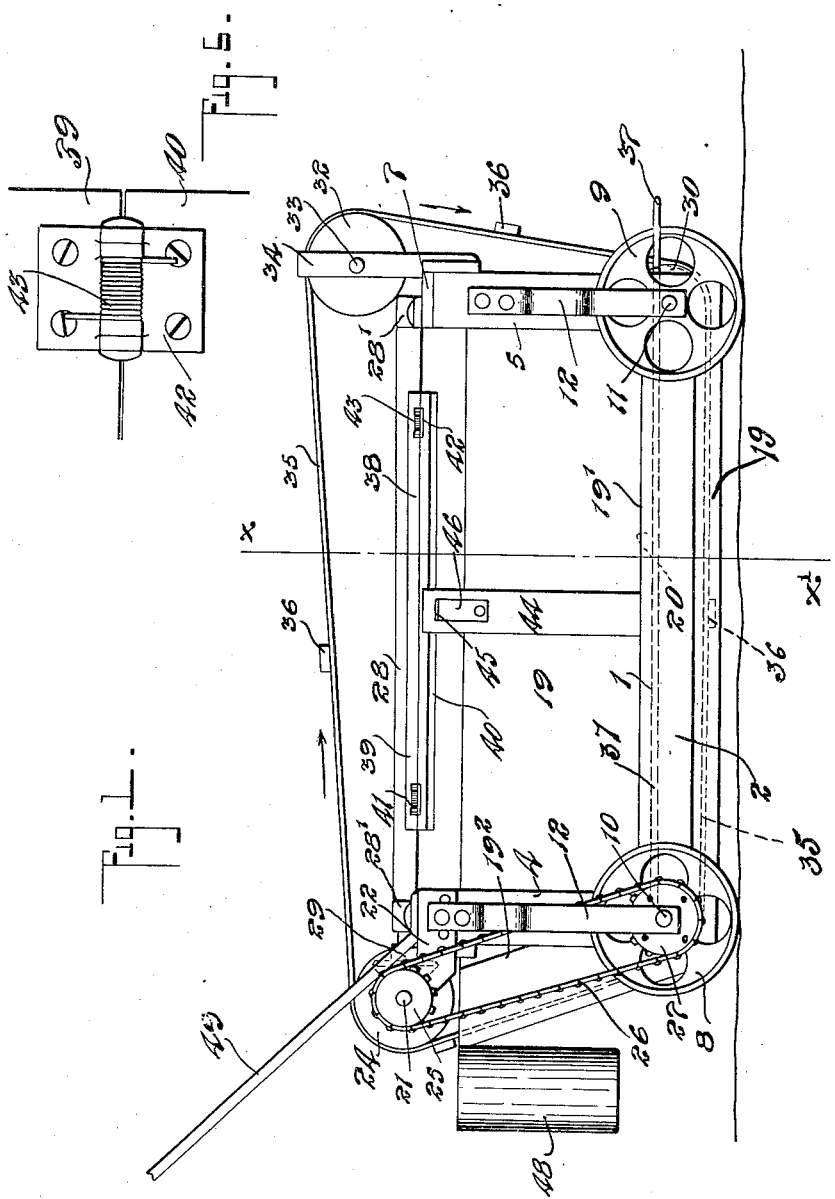
WITNESSES
INVENTOR

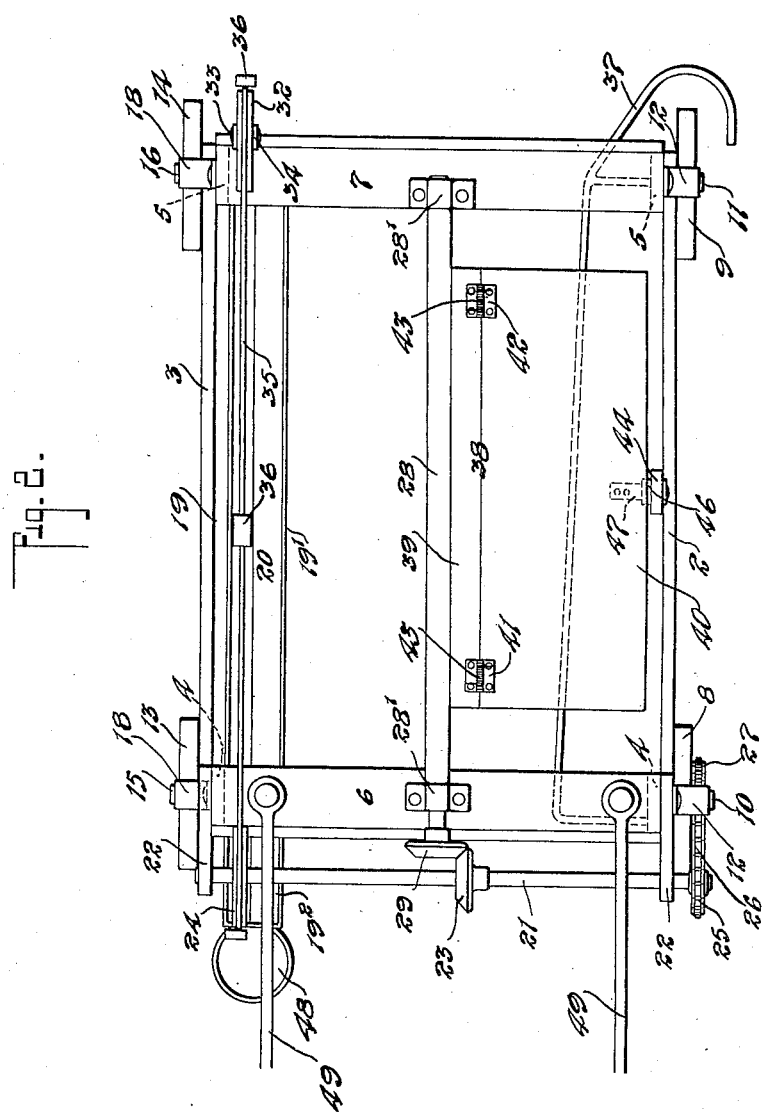

S. HANSEN.
INSECT COLLECTING MACHINE.
APPLICATION FILED NOV. 18, 1912.
1,062,648.
Patented May 27, 1913.
3 SHEETS—SHEET 3.
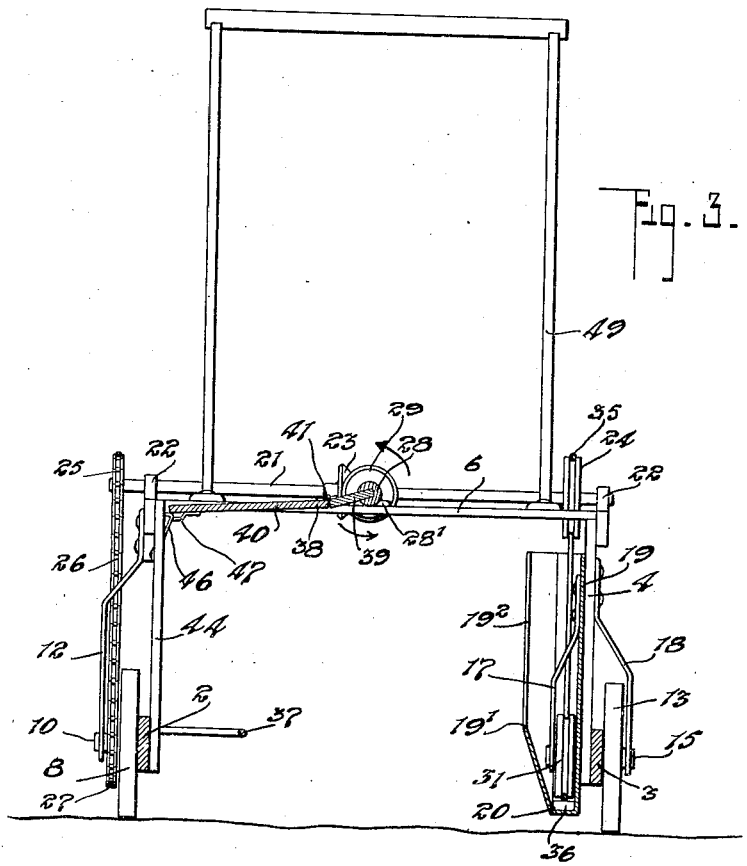
WITNESSES
INVENTOR
S. Hansen

UNITED STATES PATENT OFFICE.

SYVER HANSEN, OF DUGALD, MANITOBA, CANADA.

INSECT-COLLECTING MACHINE.

1,062,648.     Specification of Letters Patent.     Patented May 27, 1913.

Application filed November 18, 1912. Serial No. 732,019.

*To all whom it may concern:*

Be it known that I, SYVER HANSEN, of the village of Dugald, in the Province of Manitoba, Canada, have invented certain new and useful Improvements in Insect-Collecting Machines, of which the following is the specification.

The invention relates to a machine for collecting insects from shrubs or plants and the object of the invention is to provide an inexpensive and durable machine which will knock insects or bugs from small plants and deposit them in a trough where they can be collected and afterward destroyed and it consists essentially in an open wheeled frame, handles secured to the frame, a rotatable beater mounted on the frame, means for driving the beater, means for arresting and releasing the beater in its rotation, a collecting trough, an elevator passing across the trough and a receiving receptacle at the end of the trough, the parts being arranged and constructed as hereinafter more particularly described and later pointed out in the appended claims.

Figure 1 is a side elevation of the complete machine. Fig. 2 is a plan view of the same. Fig. 3 is a vertical cross sectional view through the same, the section being taken in the plane denoted by the line X—X' Fig. 1. Fig. 4 is an enlarged detailed perspective view of the spring catch piece. Fig. 5 is an enlarged detailed plan view of one of the hinges of the beater.

In the drawings like characters of reference indicate corresponding parts in each figure.

1 represents an open frame comprising two side wings 2 and 3 carrying a pair of uprights 4 and 5 connected by cross bars 6 and 7.

8 and 9 are carriage wheels located at one side of the frame and mounted on stub axles 10 and 11 extending outwardly from the beam 2 and having their outer ends supported by brackets 12. 13 and 14 are further carriage wheels located at the opposite side of the frame and mounted on axles 15 and 16 passing through the beam 3 and the adjoining uprights and having their ends mounted in pairs of inner and outer brackets 17 and 18.

19 is a guard plate secured to the uprights 4 and 5 at one side of the machine and having the lower edge thereof turned inwardly and upwardly at 19' and the rear edge thereof turned inwardly and forwardly at $19^2$ thereby forming a continuous trough 20 having a forward horizontally disposed portion and a rear upwardly inclined portion.

21 is a drive shaft mounted in suitable bearings carried by the brackets 22 extending from the uprights 4 which shaft carries a bevel pinion 23, pulley 24 and a chain wheel 25. A chain 26 connects the chain wheel 25 with a second chain wheel 27 rotatable on the shaft 10 and secured to the carriage wheel 8.

28 is a counter shaft located at right angles to the shaft 21 and mounted in suitable bearings 28' carried by the cross pieces 6 and 7.

29 is a bevel pinion fixed on the shaft 28 and meshing with the pinion 23.

30 and 31 are two similar pulleys located within the trough and rotatably mounted upon the axles 15 and 16 and 32 is a pulley rotatably mounted on a spindle 33 carried by a bracket 34 secured forwardly to the frame.

35 is an endless conveyer passing around the pulleys 24, 32, 30 and 31 and formed in the present instance from a cable or rope supplied with short cross slats 36, which slats are arranged to drag in the trough as the conveyer is operated by the rotation of the shaft 21 which it will be understood is driven by the wheel 8.

37 is a wire secured to the frame at the side opposite the conveyer and forming a means for bending toward the trough the bushes or plants over which the machine is passed.

38 is a beater carried by the shaft 28. The beater comprises the following parts:— A bar 39 passes lengthwise of the shaft and is secured permanently to the same and an apron 40 is connected pivotally by hinges 41 and 42 to the bar, the hinges being supplied with springs 43 which tend normally to hold the apron 40 in the same plane as the bar.

The frame of the machine carries an upright bar 44 fitted at the upper end with a slot 45 in which slot I have mounted a spring catch piece 46 more or less in the form of the figure 7 having the base thereof secured permanently to the bar and the top portion thereof extending through the slot and appearing on the inner face of the said bar. The catch piece is designed to engage and arrest the extending edge of the apron each revolution of the beater. The apron carries a trip bar 47 at the outer edge, which trip bar is arranged to engage with the catch piece and press the catch piece into the slot as the shaft carrying the beater rotates.

If reference be made to Fig. 3 of the drawings it will be seen that the above parts are arranged such that the trip bar initially passes the catch piece, while the outer edge of the apron is caught by the catch piece, this occurring before the hinged joint between the apron and the bar 39 is broken. As the shaft 28 continues to turn the outer edge of the apron rides for a short time on the edge of the catch piece the time being governed by the trip bar which, owing to its peculiar position and movement shoves in the catch piece as the shaft rotates and releases the edge of the apron from the catch piece. The springs then operate to flip the apron quickly down with the result that any bushes or plants adjoining the apron are struck a sharp blow. I have found that it is practically necessary to employ an apron of this kind owing to the variation of the speed at which the machine is moved over the ground in actual practice. Without the tripping device the bugs or such insects on the plants would simply be brushed off the bushes and lodged on the ground and not in the trough where one was walking and pushing the machine. With the attachment it does not make any difference how slow one moves as the tripping device will cause a sharp blow to be struck for every revolution of the shaft which blow is strong enough to dislodge the insects or bugs and direct them against the plate 19 from which they drop into the trough. Once in the trough they are collected and elevated by the conveyer over the rear end of the trough into a can 48 which I have secured to the rear end of the machine. This can can be removed from time to time and the insects or bugs contained therein destroyed.

The machine is provided with handles 49 so that it can be readily pushed over the ground. It will be understood however that the device might be provided with a hitch so that it could be pulled instead of pushed if so required.

What I claim as my invention is:—

1. An insect collecting machine, comprising an open frame formed from side beams carrying uprights connected by cross bars, carriage wheels supporting the frame a rearwardly located drive shaft rotatably carried in bearings carried by brackets secured to the rear pair of uprights, a pulley, a beveled pinion, a chain wheel fixed on the shaft, a longitudinally directed counter shaft mounted in bearings carried by the cross bars and located at one side of the frame, a beveled pinion fixed on the counter shaft and meshing with the aforesaid pinion, a beater carried by the counter shaft, a guard plate secured to the side of the frame opposite the counter shaft, and having the lower end, and one end thereof turned to form a trough, pulleys located forwardly and rearwardly within the trough, a pulley secured to the forward cross bar of the frame, an endless conveyer passing around the said pulleys and operating within the trough, said conveyer being supplied with suitably disposed cross slats, a chain wheel rotatable with one of the carriage wheels, a chain connecting said chain wheel with the aforesaid chain wheel, a handle secured to the frame rearwardly, and a wire extending longitudinally of the frame directly opposite the trough, as and for the purpose specified.

2. The combination with a portable frame, a rotatably mounted drive shaft carried by the frame, and a counter shaft driven by the drive shaft, of a bar extending lengthwise of the counter shaft and secured thereto, an apron pivotally secured to the bar by hinges, springs adjoining the hinges normally retaining the apron in the plane of the bar, a catch piece carried by the frame and designed to engage with and arrest the free edge of the apron each revolution of the shaft and a trip bar carried by the free edge of the apron and engageable with the catch piece, as and for the purpose specified.

Signed at Winnipeg this 6th day of November 1912.

SYVER HANSEN.

In the presence of—
G. S. ROXBURGH,
S. GOULD.